United States Patent
Roshan Fekr et al.

(10) Patent No.: US 12,134,973 B2
(45) Date of Patent: Nov. 5, 2024

(54) TEST BLADE FOR GAS TURBINE ENGINE AND METHOD OF MAKING

(71) Applicant: Pratt & Whitney Canada Corp., Longueuil (CA)

(72) Inventors: Masoud Roshan Fekr, St-Lambert (CA); Rana Foroutan, St-Lambert (CA); Robert Huszar, Saint-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/127,349

(22) Filed: Mar. 28, 2023

(65) Prior Publication Data

US 2024/0328321 A1    Oct. 3, 2024

(51) Int. Cl.
    *F01D 5/30* (2006.01)

(52) U.S. Cl.
    CPC ............ *F01D 5/30* (2013.01); *F05D 2220/32* (2013.01); *F05D 2230/60* (2013.01); *F05D 2240/30* (2013.01); *F05D 2260/83* (2013.01)

(58) Field of Classification Search
    CPC .......... F01D 5/30; F01D 5/18; F05D 2240/30; F05D 2260/83
    See application file for complete search history.

(56) References Cited

U.S. PATENT DOCUMENTS

| | | | |
|---|---|---|---|
| 3,694,104 A | 9/1972 | Erwin | |
| 3,720,481 A | 3/1973 | Motta | |
| 4,004,860 A | 1/1977 | Gee | |
| 4,343,593 A * | 8/1982 | Harris | F01D 5/282 416/241 A |
| 4,778,342 A | 10/1988 | Conlow | |
| 5,310,312 A | 5/1994 | Balfour | |
| 5,314,307 A | 5/1994 | Farmer | |
| 5,984,639 A | 11/1999 | Gekht et al. | |
| 6,065,938 A * | 5/2000 | Bartsch | F01D 5/3007 416/221 |
| 6,250,166 B1 | 6/2001 | Dingwell et al. | |
| 7,121,803 B2 * | 10/2006 | Gautreau | F01D 11/006 416/193 A |

(Continued)

FOREIGN PATENT DOCUMENTS

| | | |
|---|---|---|
| CN | 114964784 A | 8/2022 |
| DE | 102022200592 A1 | 7/2023 |
| FR | 3042536 B1 | 11/2017 |

OTHER PUBLICATIONS

U.S. Non-Final Office Action corresponding to U.S. Appl. No. 18/118,337; Mailing Date, Mar. 4, 2024.

(Continued)

*Primary Examiner* — Eldon T Brockman
(74) *Attorney, Agent, or Firm* — CANTOR COLBURN LLP (57) ABSTRACT

A test blade for a blade release test, including: an airfoil extending radially from a platform; and a root portion secured to the platform, the root portion having an elongated opening extending longitudinally from a leading edge of the root portion towards a trailing edge of the root portion, wherein the elongated opening has a width extending along the leading edge of the root portion that is greater than or equal to 3 times a radial height of the elongated opening.

12 Claims, 7 Drawing Sheets

(56) References Cited

U.S. PATENT DOCUMENTS

| | | | |
|---|---|---|---|
| 7,513,747 B2* | 4/2009 | Bachofner | F01D 5/3038 |
| | | | 416/248 |
| 8,864,465 B2 | 10/2014 | Viegas et al. | |
| 9,188,011 B2 | 11/2015 | Khanin | |
| 9,835,047 B2 | 12/2017 | Whitehead et al. | |
| 10,113,442 B2 | 10/2018 | Hall et al. | |
| 10,260,512 B2 | 4/2019 | Hall et al. | |
| 11,821,335 B2* | 11/2023 | Sidebotham | F01D 5/081 |
| 2004/0213672 A1* | 10/2004 | Gautreau | F01D 5/16 |
| | | | 416/190 |
| 2009/0297351 A1* | 12/2009 | Brahmasuraih | F04D 29/32 |
| | | | 416/223 R |
| 2020/0277866 A1* | 9/2020 | Dos Santos | F01D 5/3007 |

OTHER PUBLICATIONS

U.S. Final Office Action corresponding to U.S. Appl. No. 18/118,337; Issue Date, Jun. 24, 2024.
European Search Report for EP Application No. 24167327.6; Mailing Date, Jul. 11, 2024.
Extended European Search Report for EP Application 24162115.0; Mailing Date, Jul. 4, 2024.

* cited by examiner

TEST BLADE FOR GAS TURBINE ENGINE AND METHOD OF MAKING

BACKGROUND

This present disclosure relates to a test blade for a blade release test.

Gas turbine engines typically include a fan section, a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades. In addition, the fan section also includes rotating fan blades.

The fan blades, turbine blades and compressor blades, all rotate at high speed. In the unlikely event where a portion of or one of these blades becomes detached from the hub on which it is mounted while rotating may result in the blade impacting another blade and the surrounding engine casing at high speed. As such, tests are carried out to evaluate the damage which may be caused by the release of a blade during operation, in order to allow for appropriate design measures to be taken. As such, it is desirable to have a test blade designed in order to perform a predictable separation of the blade during a blade-off test.

BRIEF DESCRIPTION

Disclosed is a test blade for a blade release test, including: an airfoil extending radially from a platform; and a root portion secured to the platform, the root portion having an elongated opening extending longitudinally from a leading edge of the root portion towards a trailing edge of the root portion, wherein the elongated opening has a width extending along the leading edge of the root portion that is greater than or equal to 3 times a radial height of the elongated opening.

In addition to one or more of the features described above, or as an alternative to any of the foregoing embodiments, the elongated opening is located below the platform and above laterally extending portions of the root portion.

In addition to one or more of the features described above, or as an alternative to any of the foregoing embodiments, the laterally extending portions extend from the leading edge of the root portion to the trailing edge of the root portion.

In addition to one or more of the features described above, or as an alternative to any of the foregoing embodiments, the elongated opening is located in a middle of a neck portion of the root portion.

In addition to one or more of the features described above, or as an alternative to any of the foregoing embodiments, opposite ends of the elongated opening are curved surfaces.

In addition to one or more of the features described above, or as an alternative to any of the foregoing embodiments, the test blade is a turbine blade.

In addition to one or more of the features described above, or as an alternative to any of the foregoing embodiments, the root portion has a fir tree configuration.

In addition to one or more of the features described above, or as an alternative to any of the foregoing embodiments, the elongated opening is located below the platform and in a middle of a neck portion of the root portion.

In addition to one or more of the features described above, or as an alternative to any of the foregoing embodiments, opposite ends of the elongated opening are curved surfaces.

In addition to one or more of the features described above, or as an alternative to any of the foregoing embodiments, the test blade is a turbine blade.

In addition to one or more of the features described above, or as an alternative to any of the foregoing embodiments, the width of the elongated opening is withing a range of 3 to 6 times a radial height of the elongated opening.

Also disclosed is test blade for a blade release test, including: an airfoil extending radially from a platform; and a root portion secured to the platform, the root portion having an elongated slot extending longitudinally on an exterior surface from a leading edge of the root portion towards a trailing edge of the root portion, wherein the elongated slot is located below the platform and in a middle of a neck portion of the root portion.

In addition to one or more of the features described above, or as an alternative to any of the foregoing embodiments, the test blade is a turbine blade.

In addition to one or more of the features described above, or as an alternative to any of the foregoing embodiments, the elongated slot is a first elongated slot extending longitudinally on a first exterior surface of the test blade and a second elongated slot extends longitudinally on a second exterior surface of the test blade, the first exterior surface being opposite to the second exterior surface.

In addition to one or more of the features described above, or as an alternative to any of the foregoing embodiments, the first elongated slot is parallel to the second elongated slot.

In addition to one or more of the features described above, or as an alternative to any of the foregoing embodiments, the first elongated slot and the second elongated slot are each located above laterally extending portions of the root portion.

In addition to one or more of the features described above, or as an alternative to any of the foregoing embodiments, the laterally extending portions extend from the leading edge of the root portion to the trailing edge of the root portion.

In addition to one or more of the features described above, or as an alternative to any of the foregoing embodiments, the first elongated slot and the second elongated slot each have curved surfaces.

In addition to one or more of the features described above, or as an alternative to any of the foregoing embodiments, the test blade is a turbine blade.

Also disclosed is method for forming a test blade for a blade release test, including: forming the test blade with an airfoil extending radially from a platform of the test blade; and securing a root portion to the platform, the root portion having an elongated opening extending longitudinally from a leading edge of the root portion towards a trailing edge of the root portion, wherein the elongated opening has a width that is greater than or equal to 3 times a height of the elongated opening.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
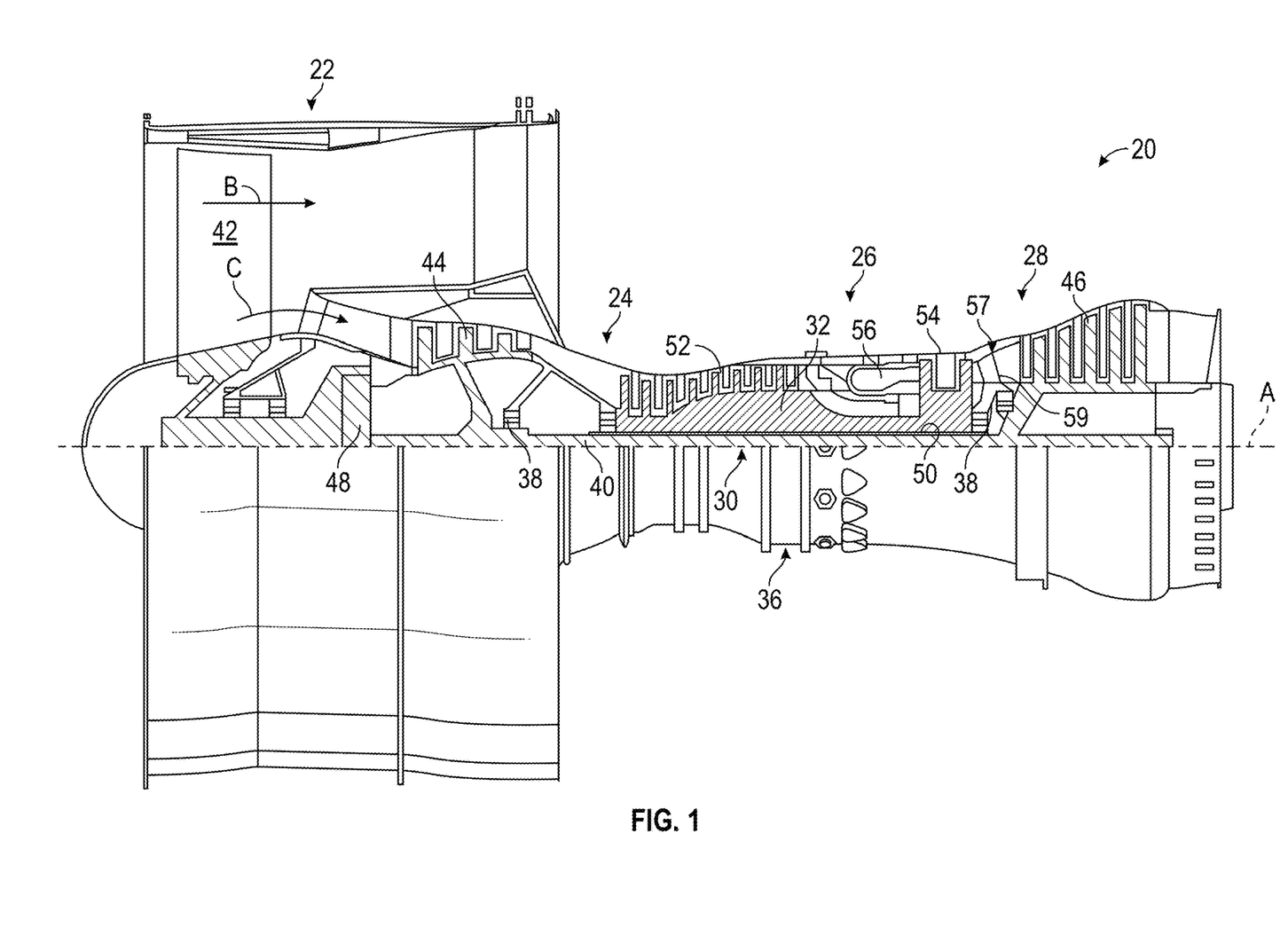
FIG. 1 is a schematic, partial cross-sectional view of a gas turbine engine in accordance with this disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first or low pressure compressor 44 and a first or low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second or high pressure compressor 52 and a second or high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 illustrated in FIG. 1 is merely exemplary and the present disclosure is contemplated for use with any type of gas turbine engine that has blades secured to a rotating hub.

Figure 2:
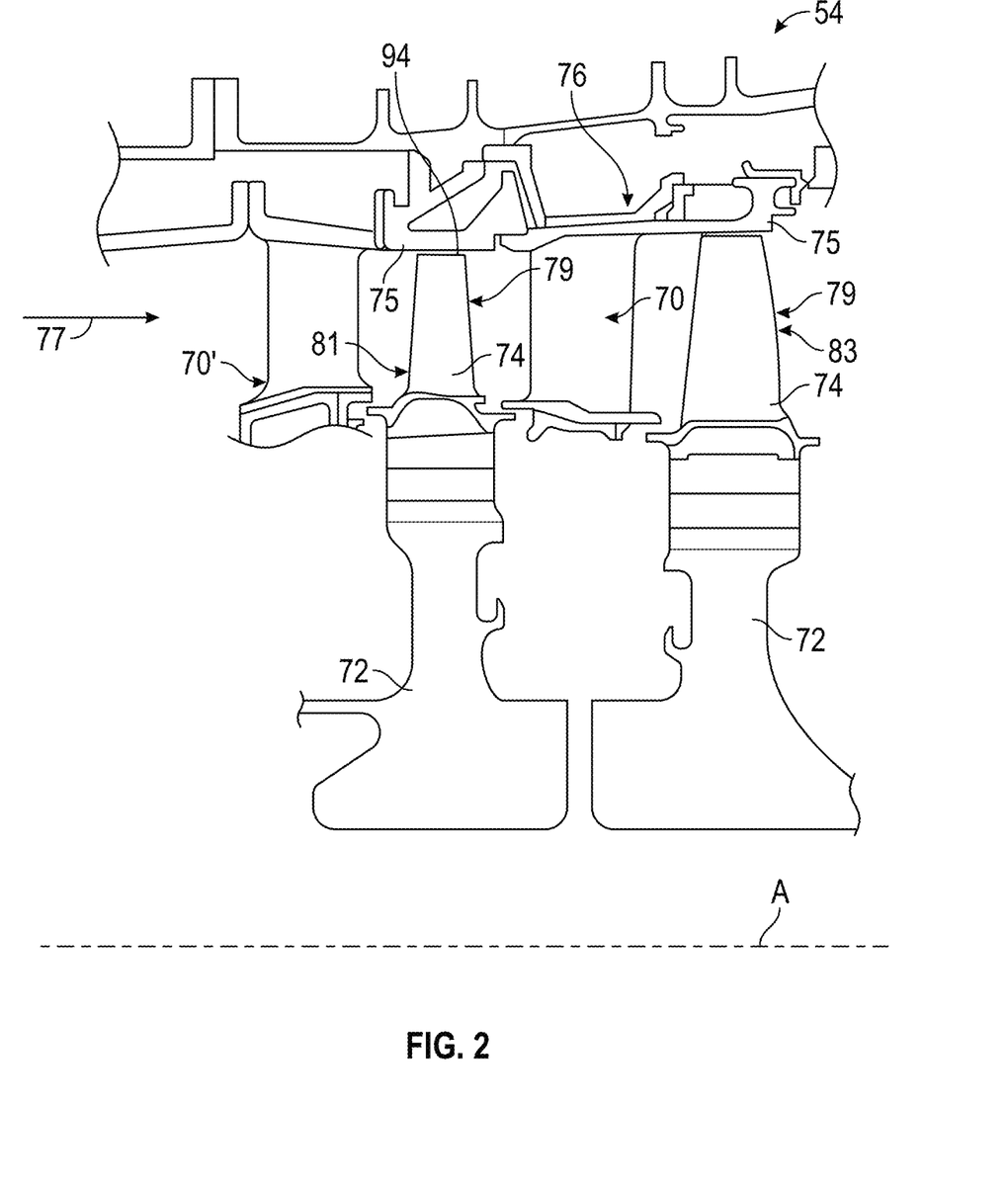
FIG. 2 is a schematic view of a two-stage high pressure turbine of the gas turbine engine.

FIG. 2 illustrates a portion of the high pressure turbine (HPT) 54. FIG. 2 also illustrates a high pressure turbine stage vanes 70 one of which (e.g., a first stage vane 70') is located forward of a first one of a pair of turbine disks 72 each having a plurality of turbine blades 74 secured thereto. The turbine blades 74 rotate proximate to blade outer air seals (BOAS) 75 which are located aft of the vane 70 or first stage vane 70'. The other vane 70 is located between the pair of turbine disks 72. This vane 70 may be referred to as the second stage vane. As used herein the first stage vane 70' is the first vane of the high pressure turbine section 54 that is located aft of the combustor section 26 and the second stage vane 70 is located aft of the first stage vane 70' and is located between the pair of turbine disks 72. In addition, blade outer air seals (BOAS) 75 are disposed between the first stage vane 70' and the second stage vane 70. The high pressure turbine stage vane 70 (e.g., second stage vane) or first stage vane 70' is one of a plurality of vanes 70 that are positioned circumferentially about the axis A of the engine in order to provide a stator assembly 76. Hot gases from the combustor section 26 flow through the turbine in the direction of arrow 77. Although a two-stage high pressure turbine is illustrated other high pressure turbines are considered to be within the scope of various embodiments of the present disclosure.

Figure 3:
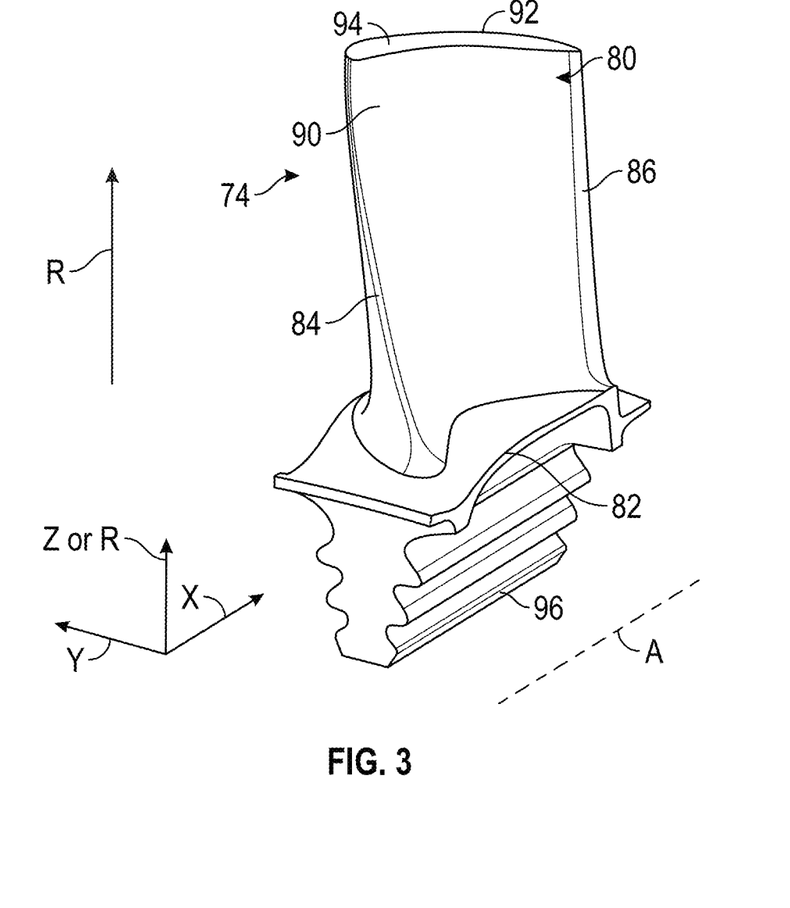
FIG. 3 is perspective view of a turbine blade.

Referring now to at least FIGS. 1-3, a turbine blade 74 is illustrated. As mentioned above, turbine blades 74 are secured to a turbine disk 72 that is configured to rotate about axis A. The turbine disk 72 and its turbine blades 74 may be referred to as a turbine rotor assembly 79. The turbine blades 74 and their associated disks 72 are located behind or downstream from either the first stage vane 70' or the second stage vane 70. The turbine blades located behind the first stage vane 70' and in front of the second stage vane 70 may be referred to first stage turbine blades 81 and the turbine blades 74 located behind the second stage vane 70 may be referred to second stage turbine blades 83. The turbine disk 72 and its turbine blades 74 may be referred to as a turbine rotor assembly 79, which depending on its location (e.g., located behind or downstream from either the first stage vane 70' or the second stage vane 70) the turbine rotor assembly may be referred to as a first stage turbine rotor assembly (behind or downstream from the first stage vanes 70' and before or upstream from the second stage vanes 70) or as a second stage turbine rotor assembly (behind or downstream from the second stage vanes 70 and behind or downstream, from the first stage turbine rotor assembly) of a high pressure turbine of the gas turbine engine.

Each turbine blade 74 has an airfoil 80 that extends radially from a platform 82. When the turbine blade 74 is secured to the turbine disk 72 and the disk 72 is secured to the engine 20, the airfoil 80 is further away from axis A than the platform 82. In other words, the airfoil 80 extends radially away from the platform 82 such that the airfoil 80 is at a further radial distance from the axis A than the platform 82. The surface of the platform 82 may be contoured to minimize aerodynamic losses.

The airfoil 80 has a leading edge 84 and a trailing edge 86. The airfoil 80 has a pressure side 90 and a suction side 92 each of which extends between the leading edge 84 and the trailing edge 86. The airfoil also terminates at a tip 94 that is furthest radially from the platform 82. Also shown in at least FIG. 3, is a root, root tree or root portion 96. Root, root tree or root portion 96 is used to secure the turbine blade 74 to the turbine disk 72. In one non-limiting embodiment, the root portion has a fir tree configuration. In one embodiment, the airfoil 80 may be integrally formed or cast with the platform 82 and/or the root portion 96. In other words, the turbine blade 74 including the airfoil 80, the platform 82 and the root 96 may be cast as a single part.

The geometry the blade 74 may be defined along X, Y and Z axes, which respectively correspond to the axial (X), circumferential (Y) and radial (Z or R) directions shown in at least FIG. 3

Figure 4:
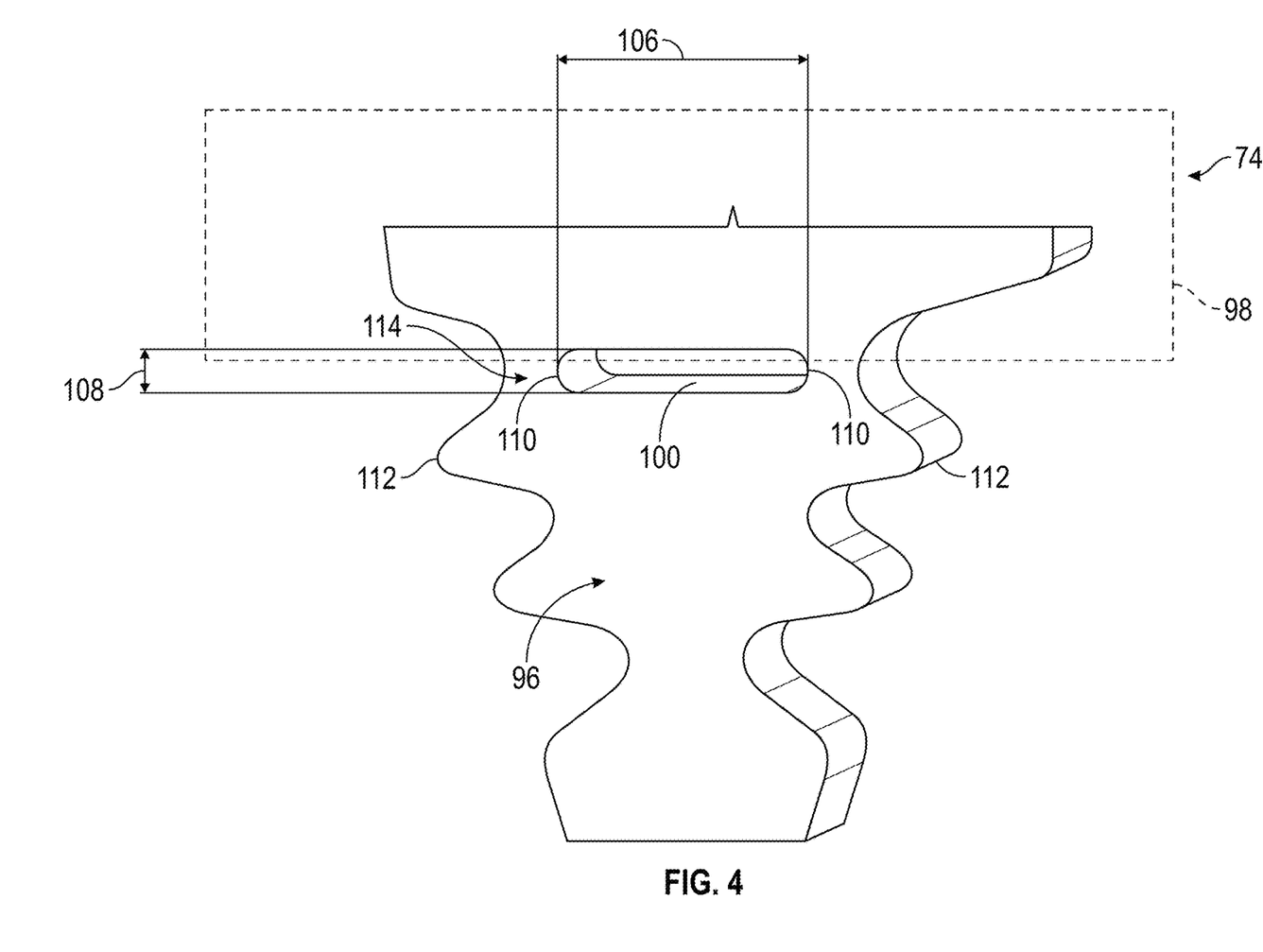
FIG. 4 is a perspective end view of a root of a test blade in accordance with the present disclosure.

Referring now to FIGS. 4-7 portions of a test blade 74 in accordance with present disclosure is illustrated. Test blade 74 is similar to the configuration illustrated in FIG. 3 however openings or slots are formed in the root portion 96 such that when the test blade 74 is rotated at certain speeds when secured to a test wheel or turbine disk 72 in a test engine, the blade-off segment, which comprises the airfoil 80, the platform 82 and a top of the root portion 96 of the test blade 74, will separate from the root portion 96 such that test data pertaining to the blade-off segment separation event may be achieved. The top of the root portion 96 is located within section 98 as shown in FIG. 4. In other words, the top of the root portion 96 is the portion of the root portion 96 radially above where the test blade separates from radially lower portions of the root portion 96. Use of the test blade 74 can be in either a separate hub similar to turbine disk 72 that is rotated until the desired separation occurs and/or a test engine wherein rotation of the turbine disk 72 at a certain speed causes the blade-off segment to separate. When used in a test engine the separation of the blade-off segment will cause certain conditions to occur which can be monitored in order to design engines to operate in the unlikely event where a blade-off occurs. It being understood that while a turbine blade 74 is illustrated, various embodiments of the present disclosure may also pertain to compressor or fan blades.

Figure 5:
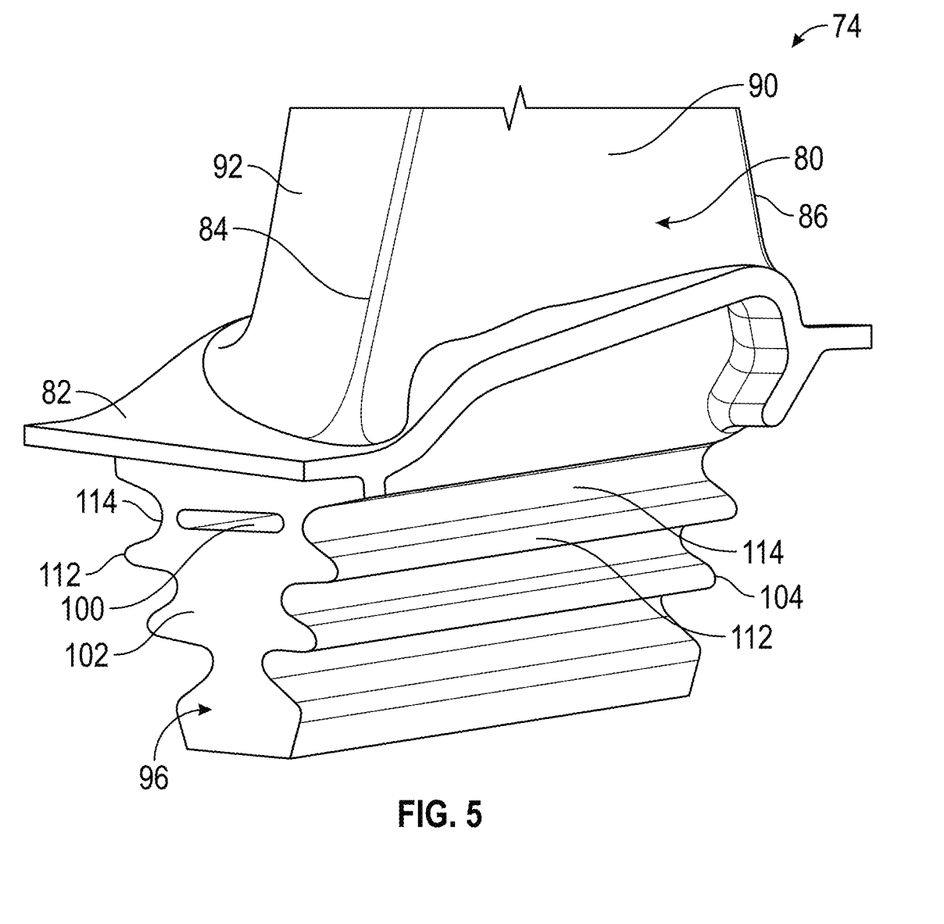
FIG. 5 is a perspective view of a root of a test blade in accordance with the present disclosure.

Referring now to FIGS. 4 and 5, the root portion 96 of the test blade 74 has an elongated opening or slot 100 extending longitudinally from a leading edge 102 of the root portion 96 towards a trailing edge 104 of the root portion 96. The elongated opening 100 has a width 106 that extends in the circumferential (Y) direction and a height 108 that extends in the radial (Z or R) direction as illustrated in at least FIG. 3. In other words, the width 106 and the height 108 are transverse to the axial direction X of the test blade 74. The elongated opening may have different shapes for example and in one non-limiting embodiment, the opening or slot may be elliptical in shape, rectangular in shape or have a race track configuration. In one non-limiting embodiment, the ends 110 of the elongated opening 100 in the circumferential (Y) direction may be configured with curved surfaces. As such, the elongated opening 100 illustrated in FIGS. 4 and 5 may be referred to as a race track slot configuration.

The length of the width 106 is significantly greater than the height 108. For example, the length of the width 106 can be greater than or equal to 3 times a radial height of the elongated opening. In one contemplated configuration the width 106 is about 3 to 6 times greater than the radial height of the elongated opening 108. It is understood that other ranges or dimensions are considered to be within the scope of the present disclosure.

The location and size of the embedded slot or opening 100 in the test blade 74 can be varied in order to cause a blade-off separation at specific speeds and temperatures in order to vary the blade-off loads for testing purposes. The axial and radial position of the slot are variable based on the blade design for a blade-off test. The variables of the embedded slot geometry are in one non-limiting embodiment: slot shape and dimensions, axial position and radial position.

The area of the slot or opening 100 may be varied after testing to provide different or desired separation of the blade-off segment from the root portion 96 during subsequent tests. For example, the area of the opening 100 correlates to the speeds required to have the blade-off segment separate from the root portion 96 at specific speeds. In other words, by employing the opening disclosed herein variations in the area of the opening can be used to tune the blade-off segment of the blade 74 to separate at desired conditions for blade-off testing or blade release testing.

By employing this configuration, testing of the test blade 74 may be performed and the area of the slot or opening 100 of the root portion 96 can be reamed after testing, either from the leading edge 102 and/or from the trailing edge 104, to provide separation of the blade-off segment from the root portion 96 for subsequent tests at a desired rotational speed. For example, the area of the opening or slot 100 correlates to the speeds required to have the blade-off segment separate from the root portion 96 for blade-off testing or blade release testing.

As illustrated, a center of the elongated opening 100 is located below the platform 85 and above the highest laterally extending portions 112 of the root portion 96 or in other words, the elongated opening 100 is located in the middle/narrowest neck portion 114 of the root portion 96. The area of elongated opening or slot 100 reduces the size of the material providing the uppermost neck portion 114 of the root portion 96 which in turn determines when blade-off is reached at specific speeds and/or temperatures. In one embodiment, the elongated opening 100 is located in the middle of the uppermost neck portion 114. The laterally extending portions 112 extending from the leading edge 102 of the root portion 96 to the trailing edge 104 of the root portion 96.

Figure 6:
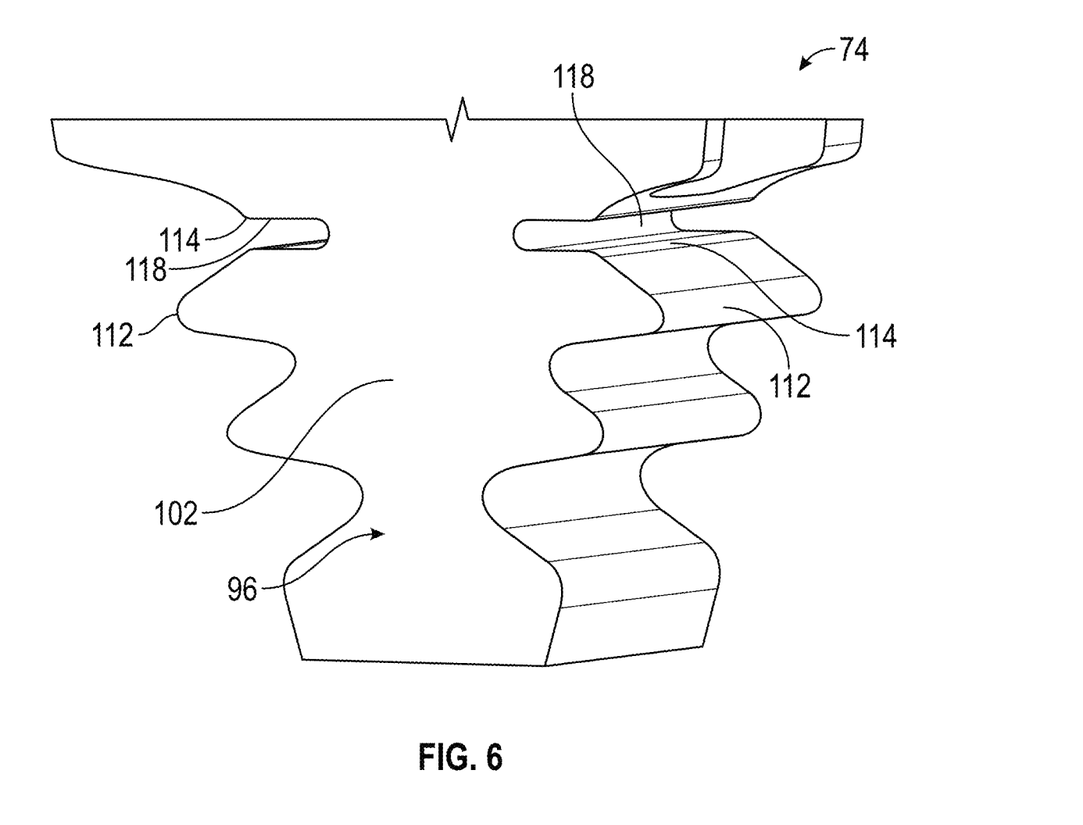
FIG. 6 is a perspective end view of a root of a test blade in accordance an embodiment of the present disclosure.
Figure 7:
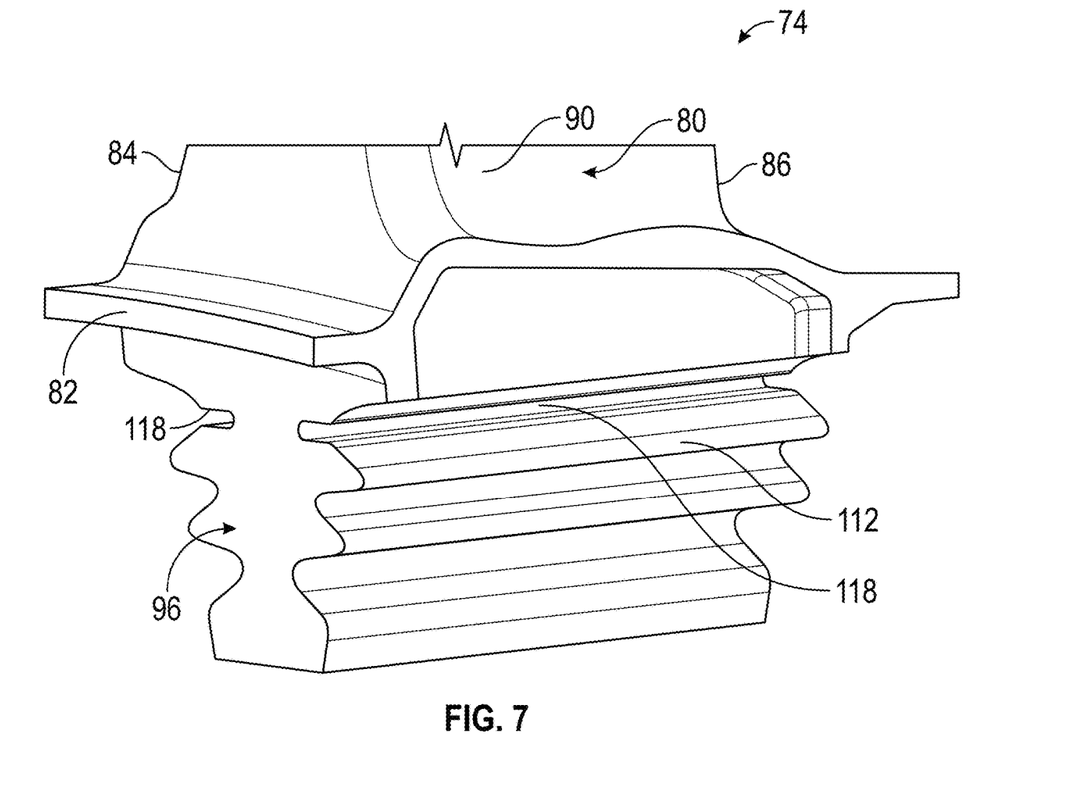
FIG. 7 is a perspective view of a root of a test blade illustrated in FIG. 6 in accordance with the present disclosure.

Referring now to FIGS. 6 and 7, an alternative embodiment of the present disclosure is illustrated. Here an elongated slot 118 is located in either or both exterior sides of the uppermost neck portion 114 which extend from the leading edge 102 to the trailing edge 104 of the root portion 96. In other words, the slot 118 may be located on either or both sides of the root portion 96 that are aligned with the pressure side 90 and the suction side 92 of the airfoil 80. In this embodiment, the elongated slot or slots 118 are employed instead of opening 100. In one non-limiting embodiment, the area of slots 118 is substantially equal to the area of opening 100. In other words, if slots 118 are combined they will equal the area of opening 100. For example, the slots 118 have curved surfaces which in one non-limiting embodiment are substantially similar in shape and size to the ends 110 of the elongated opening 100.

In one non-limiting embodiment and where two slots 118 are employed, the slots 118 are parallel to each other and are located in the same radial plane.

Accordingly, various embodiments of the present disclosure contemplate a blade 74 for use in blade off testing or blade release testing where the root portion can be configured with opening 100 or slots 118 where separation of the blade-off segment from the root portion 96 can be achieved at certain testing conditions.

In one non-limiting embodiment, the opening 100 and slots 118 may be formed in the root portion 96 via electrical discharge machining (EMD).

The term "about" is intended to include the degree of error associated with measurement of the particular quantity based upon the equipment available at the time of filing the application. For example, "about" can include a range of ±8% or 5%, or 2% or 1% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A test blade for a blade release test, comprising:
   an airfoil extending radially from a platform; and
   a root portion secured to the platform, the root portion having an elongated opening extending longitudinally from a leading edge of the root portion towards a trailing edge of the root portion, wherein the elongated opening has a width extending along the leading edge of the root portion that is greater than or equal to 3 times a radial height of the elongated opening.

2. The test blade as in claim 1, wherein the elongated opening is located below the platform and above laterally extending portions of the root portion.

3. The test blade as in claim 2, wherein the laterally extending portions extend from the leading edge of the root portion to the trailing edge of the root portion.

4. The test blade as in claim 3, wherein the elongated opening is located in a middle of a neck portion of the root portion.

5. The test blade as in claim 4, wherein opposite ends of the elongated opening are curved surfaces.

6. The test blade as in claim 5, wherein the test blade is a turbine blade.

7. The test blade as in claim 6, wherein the root portion has a fir tree configuration.

8. The test blade as in claim 1, wherein the elongated opening is located below the platform and in a middle of a neck portion of the root portion.

9. The test blade as in claim 1, wherein opposite ends of the elongated opening are curved surfaces.

10. The test blade as in claim 1, wherein the test blade is a turbine blade.

11. The test blade as in claim 1, wherein the width of the elongated opening is withing a range of 3 to 6 times a radial height of the elongated opening.

12. A method for forming a test blade for a blade release test, comprising:
   forming the test blade with an airfoil extending radially from a platform of the test blade; and
   securing a root portion to the platform, the root portion having an elongated opening extending longitudinally from a leading edge of the root portion towards a trailing edge of the root portion, wherein the elongated opening has a width that is greater than or equal to 3 times a height of the elongated opening.

* * * * *